United States Patent [19]
Mauvernay et al.

[11] 3,718,650
[45] Feb. 27, 1973

[54] NEW DERIVATIVES OF SUBSTITUTED PIPERAZINES

[75] Inventors: Roland Yves Mauvernay, Riom, Norbert Busch, Puy de Dome, Jacques Moleyre, Menetrol, Jacques Simond, Chamalieres, all of France

[73] Assignee: Societe Anonyme Centre Europeen De Recherches Mauvernay, Riom, France

[22] Filed: Feb. 23, 1971

[21] Appl. No.: 118,077

[30] Foreign Application Priority Data

March 2, 1970 France..................................7007383

[52] U.S. Cl............260/268 R, 260/348 R, 424/250
[51] Int. Cl................................................C07d 51/70
[58] Field of Search....................................260/268 R

[56] References Cited

UNITED STATES PATENTS

| | | |
|---|---|---|
| 2,963,483 | 12/1960 | Heywood..........................260/268 R |
| 3,036,076 | 5/1962 | Gabler..............................260/268 R |
| 3,378,553 | 4/1968 | Vigelius...........................260/268 R |
| 3,448,192 | 6/1969 | Mauvernay.......................260/268 H |

FOREIGN PATENTS OR APPLICATIONS 1,548,391 12/1968 France...............................260/268 R Primary Examiner—Donald G. Daus
Attorney—Melville, Strasser, Foster & Hoffmann

[57] ABSTRACT

A process for obtaining substituted piperazine derivatives, notably an amino-alcohol derivative for therapeutic use, is described.

At least one epoxide, particularly 3-phenyl, 3-methoxy, 1,2-propylene oxide is reacted on a substituted piperazine, particularly 1-(2-phenyl, 2-methoxy)ethyl piperazine. The invention notably relates to a new amino-alcohol formula (I).

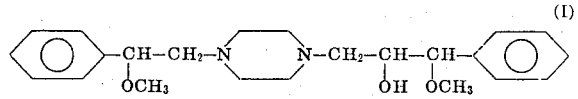

as well as the addition salts thereof with organic or inorganic acids which are pharmaceutically acceptable.

The application of the compound of formula (I) in medicines having antitussive, mucolytic and eupneic actions.

2 Claims, No Drawings

NEW DERIVATIVES OF SUBSTITUTED PIPERAZINES

The present invention relates in a general manner to a process for obtaining substituted piperazine derivatives. It relates more especially to an amino-alcohol derivative and the addition salts thereof with pharmaceutically acceptable organic or inorganic acids. The invention also relates to the applications of said amino-alcohol as a medicament, and particularly as an antitussive agent.

French Pat. n°7 304 M has already described compounds of the general formula:

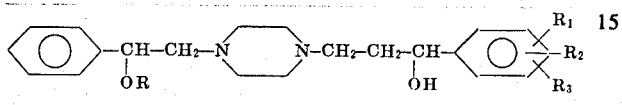

wherein : R is a straight or branched chain alkyl radical, and $R_1 - R_2 - R_3$, identical or different, representing notably either hydrogen, or an alkoxy or alkenoxy alkyl.

These compounds possess bronchospasmolytic properties. They can be prepared by a three-stage process which is described in the aforesaid patent. In a first stage, (2-phenyl, 2-alkoxy)-ethylbromide is prepared by alkoxybromation of styrene by means of tertio-butyl hypobromite in the alcanol corresponding to R; in a second stage, 1-(2-phenyl, 2-alkoxy)-ethylpiperazine by the action of piperazine on the product of stage 1, in a third stage a Mannich reaction is effected between the product of stage 2, formaldehyde and acetophenone bearing the substituants corresponding to $R_1$, $R_2$ and $R_3$, and finally, the product of stage 3 is reduced by means of sodium borohydride.

French Pat. 5390 M also described compounds having, notably the formula:

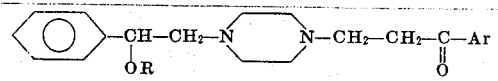

wherein R is a lower alkyl radical and Ar is an aromatic radical, particularly the phenyl radical.

These compounds possess antitussic properties. To obtain them, a 1-(2-phenyl-2-alkoxy)-ethyl-piperazine is reacted with a ketone and formol (Mannich reaction) or with 4-vinyl-pyridine, according to the signification of R in the preceding formula. The starting 1-(2-phenyl-2-alkoxy)-ethyl-piperazine is obtained by the action of piperazine on 2-phenyl-2-alkoxy-ethyl bromide, which is obtained by the reaction of vinylbenzene on the corresponding R'—OH alcohol in the presence of tertio-butyl hypobromite.

The invention relates to a process for obtaining new derivatives of substituted piperazine derivatives characterized in that at least one epoxide is reacted on a substituted piperazine.

Generally speaking, the process can be carried out in a solvent medium and at a moderately high temperature. For example, ethanol and temperatures lower than 100° C are used. Substituted alkylene-oxides may be used alone or in combinations. Substantially equimolar amounts of reactives are usually suitable.

The invention will be illustrated more particularly hereinafter with reference to a compound which may be obtained by such a process and which consists of an amino alcohol of the general formula:

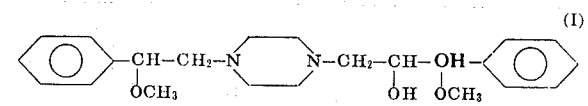

Compound (I) is obtained according to the process of the invention by the condensation of 1-[2-phenyl,2-methoxy] ethyl piperazine with 3-phenyl, 3-methoxy, 1,2-propylene oxide according to the following reactional diagram:

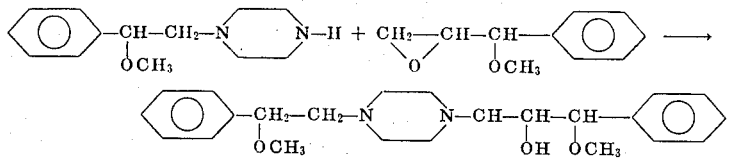

For the preparation of 1-[2-phenyl,2-methoxy] ethyl piperazine, referring advantageously to the process described in the aforesaid patent n°7304 M, which is introduced into the present description as a reference.

In order to prepare 3-phenyl, 3-methoxy, 1,2-propylene-oxide, the process which is the object of French Pat. n° 6944218 may be used. Said process which is carried out in two stages starting with cinnamic alcohol, can be illustrated by the following reaction diagram in the case of 3-phenyl, 3-methoxy,1,2-propylene oxide.

FIRST STAGE

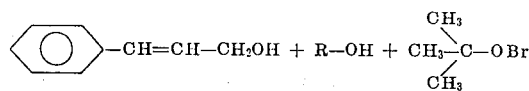

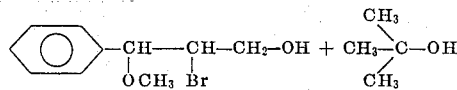

SECOND STAGE

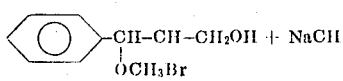

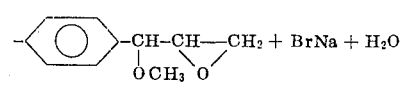

Compound (I) has remarkable antitussive properties as well as a certain bronchospasmolytic activity. It further has the advantage, compared with the compounds described in French Pat. n° 5 390 M, of giving addition salts which are very stable in aqueous solution. The example which follows illustrates the synthesis of compound (I).

EXAMPLE

In a reactor provided with a mechanical stirrer, a reflux refrigerant and a thermometer, there is introduced:

393 g 1- [2-phenyl, 2-methoxy]ethyl piperazine
22 g 3-phenyl, 3-methoxy propylene oxide in 750 ml of absolute ethanol.

When the slightly exothermic reaction (rise in temperature of about 20 degrees) has ceased, heating is effected for 1.5 hours at 60° C. The product is then cooled to 4° C and left to crystallize for about 12 hours. The precipitate is centrifugated then recrystallized in 500 ml of absolute ethanol.

420 g of the desired compound (I) is thus obtained in the form of a white, crystalline powder.
Melting point : 83 °C
Elementary analysis:

|  | N % | C % | H % |
|---|---|---|---|
| Calculated | 7,28 | 71,86 | 8,39 |
| Found | 7,25 | 71,51 | 8,20 |

To obtain a hydrosoluble salt, it is possible, for example, to prepare the dichlorohydrate by adding an ethanol solution of anhydrous HCl in a calculated amount to a suspension of 410 g of the product in 500 ml absolute ethanol.

Under these conditions, 440 g of dichlorohydrate are obtained:
Melting point: 231°C
HCl by the CHARPENTIER-VOHLARD method:
Cl⁻% calculated: 15.96
Cl⁻% found: 15.90

PHARMACODYNAMIC STUDY RELATING TO COMPOUND (I)

1. Accute Toxicity

This was sought for by the oral method in the mouse. The LD 50, calculated according to B. BEHRENS and C. KARBER [Arch. F. Exp. Path. Pharm. 177:379(1935)] gave the following result:

LD 50 = 550 mg/kg.

2. Antitussive Action Studied on the Cat

The cat is anesthetized with ether and tracheotomized. Coughing spasms are induced by the stimulation of a laryngeal nerve. After administration of the product to be studied, new stimulations permit the inhibition obtained and its duration to be evaluated. [DOMENJOZ R. Arch.Exp. Pathol. V. Pharmacol,215 19 (1952)]. The results obtained by this method are shown in table I.

TABLE I

| Dose and method of administration | Maximum of inhibition | Time lag before the appearance of maximal inhibition | Disappearance of the activity |
|---|---|---|---|
| 2 mg/kg I.V. | 77 % tn 6 minutes | | 28 minutes |
| 5 mg/kg I.D. | 21 % | 20 minutes | 27 minutes |
| 10 mg/kg I.D. | 84 % | 21 minutes | 65 minutes | b. Kase Method

Caughing spasms are induced in the cat, anesthetized with pentobarbital, by mechanical excitation of the tracheal mucous. The antitussive activity is judged as for the DOMENJOZ method. KASE Y. Japan J. Pharmacol., 1952 (2,7) KASE Y. Japan J. Pharmacol., 1955,130.

The results obtained by this method are given in Table II.

TABLE II

| Dose and method of administration | Maximum % of inhibition | Time lag before the appearance of maximal inhibition | Disappearance of the activity |
|---|---|---|---|
| 10 mg/kg I.D. | 52% | 25 minutes | 85 minutes |
| 20 mg/kg I.D. | 94% | 25 minutes | 130 minutes |

3. "IN VIVO" ANTIHISTAMIC ACTION ON THE GUINEA PIG

This action was investigated by the study of antagonism with respect to histamine that as bronchoconstrictor agent.

a. Protection with Respect to Bronchospasms Induced by a Histamine Aerosol

The bronchospasm is induced in the guinea pig by a histamine aerosol (solution at 3‰ in a 20 percent glycerine solution).

The period of time to the appearance of the accute crisis of dyspnea is noted for each animal. Twenty four hours later the animals are subjected to a second exposure to the aerosol, 45 minutes after treatment with the substance being studied, and the period of time to the appearance of the crisis of dyspnea is also noted.

The protection afforded by the substance tested is estimated by the increase of the duration of exposure to the bronchoconstrictor aerosol. An increase of more than ten minutes with respect to the control time is considered as a total protection.

In the case of the compound studied, an ED 50 value, given orally, of 45 mg/kg is obtained.

b. Protection with Respect to Mortal Bronchospasm Induced by an Intravenous Injection of Histamine The control animals are male guinea pigs which are injected intravenously with 2.5 mg/kg histamine (this dose is five times the minimal mortal dose, which is 0.5 mg/kg).

The time the crisis starts is noted, as well as the time of death.

The animals treated received the product by oesophageal intubation, forty five minutes before the intravenous injection of histamine.

For a dose of the compound studied of 25 mg/kg given by mouth, 4 animals out of 10 are protected.

4. IN VITRO SPASMOLYTIC ACTION ON GUINEA PIG ILEUM

The ileum is removed from a guinea pig killed by bleeding. A 2 to 3 centimeter long fragment is placed in a tank containing the Tyrode solution maintained at 30° C and oxygenated.

The ileum is stretched between the support on the bottom of the tank and the recording level. The recording is made on a cylinder coated with lamp black.

Determination is carried out of the concentration of the product necessary to decrease or abolish the contraction induced by:
- $2.10^{-5}$ g/l histamine
- $5.10^{-5}$ g/l acetylcholine
- $1,6.10^{-1}$ g/l baryum chloride.

When compound (I) is tested, the ED 50 values given in table III below are obtained:

TABLE III

| Contracting agent | ED 50 |
| --- | --- |
| Acetylcholine | $4.5 \times 10^{-3}$ g/l |
| Histamine | $1.1 \times 10^{-2}$ g/l |
| Baryum chloride | $2.3 \times 10^{-3}$ g/l |

The therapeutic indications of compound (I) result from the preceeding considerations. It was found that compound (I) and the compositions containing it, particularly the addition salts thereof with pharmaceutically acceptable acids, possess antitussive, mycolytic and eupneic actions.

The medicaments containing, as an active agent, compound (I) or at least one of the acid addition salts thereof can be administered: orally, in the form of tablets, gellules, capsules, soluble granules, drops, syrup containing 40 to 100mg of active compound per dosage unit. —by the rectum, in the form of suppositories or rectal capsules, containing 100 to 200 mg of active compound per dosage unit, associated with the excipients usually used in such preparations.

What we claimed is:

1. The substituted piperazine compound consisting of an amino alcohol of the formula (I)

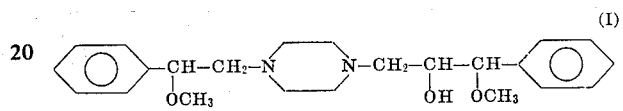

as well as the addition salts thereof with organic or inorganic acids which are pharmaceutically acceptable.

2. Salts according to claim 1 characterized in that they are hydrosoluble.

* * * * *